W. S. EATON.
HYDROAEROPLANE.
APPLICATION FILED JULY 20 1917.
1,273,836.
Patented July 30, 1918.
4 SHEETS—SHEET 3.
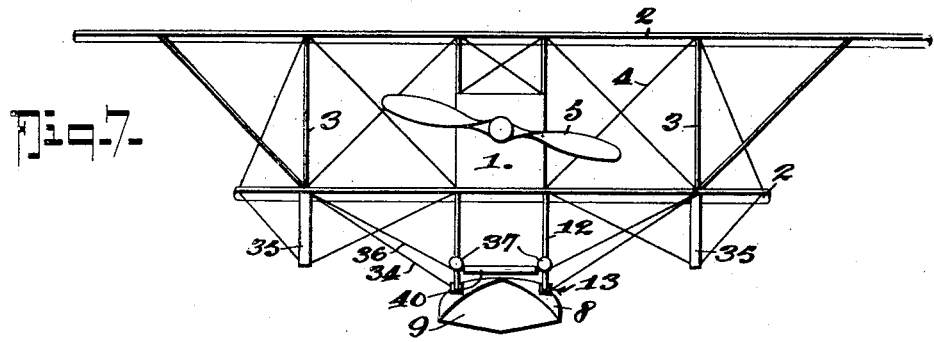
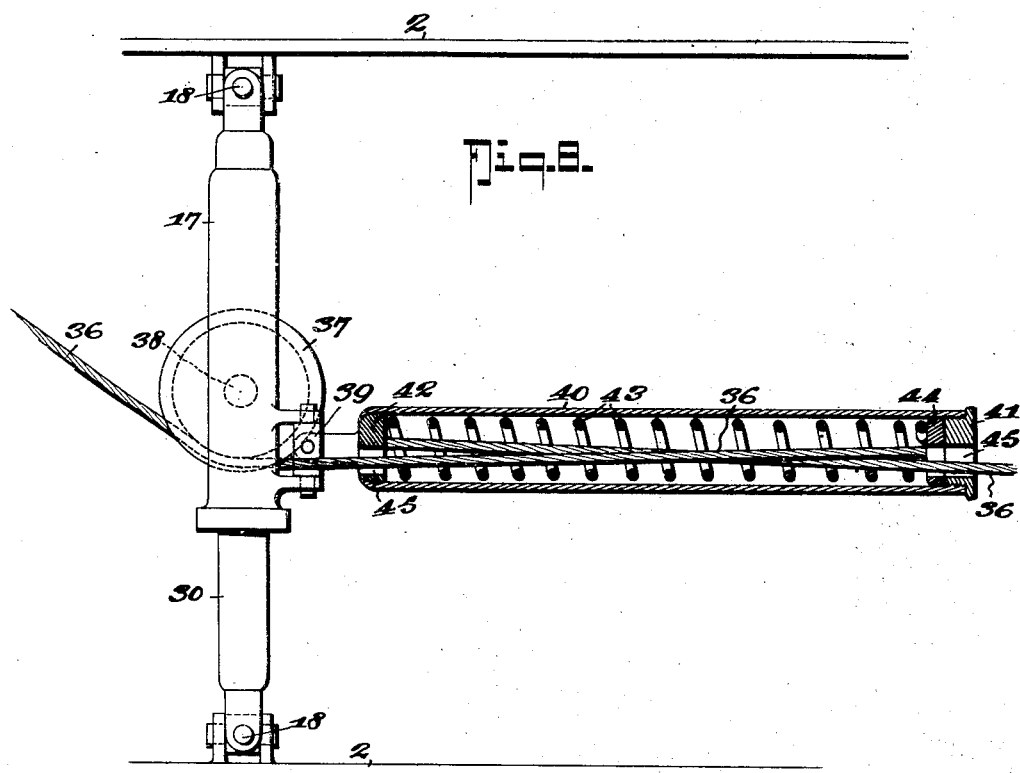
INVENTOR
Warren S. Eaton.
BY
Fred G. Dieterich
ATTORNEYS W. S. EATON.
HYDROAEROPLANE.
APPLICATION FILED JULY 20, 1917.
1,273,836.
Patented July 30, 1918.
4 SHEETS—SHEET 4.
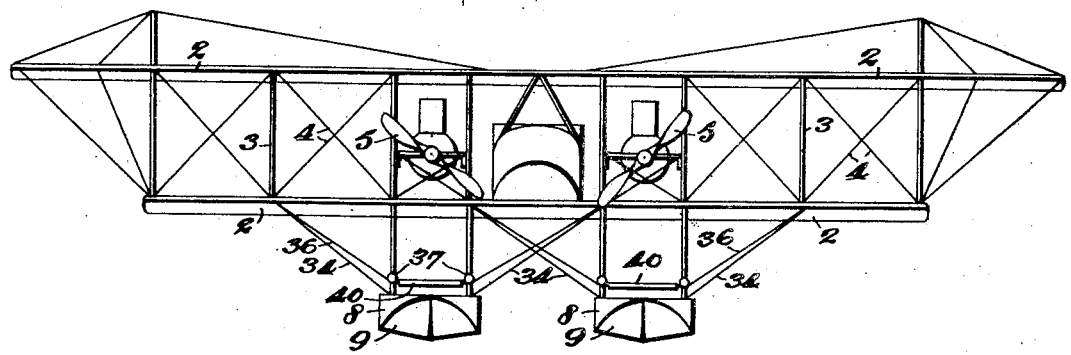
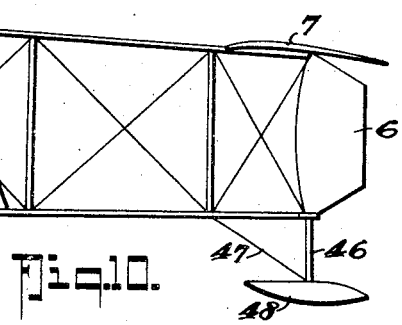
INVENTOR
Warren S. Eaton.
BY
Fred J. Dieterich & Co.
ATTORNEYS

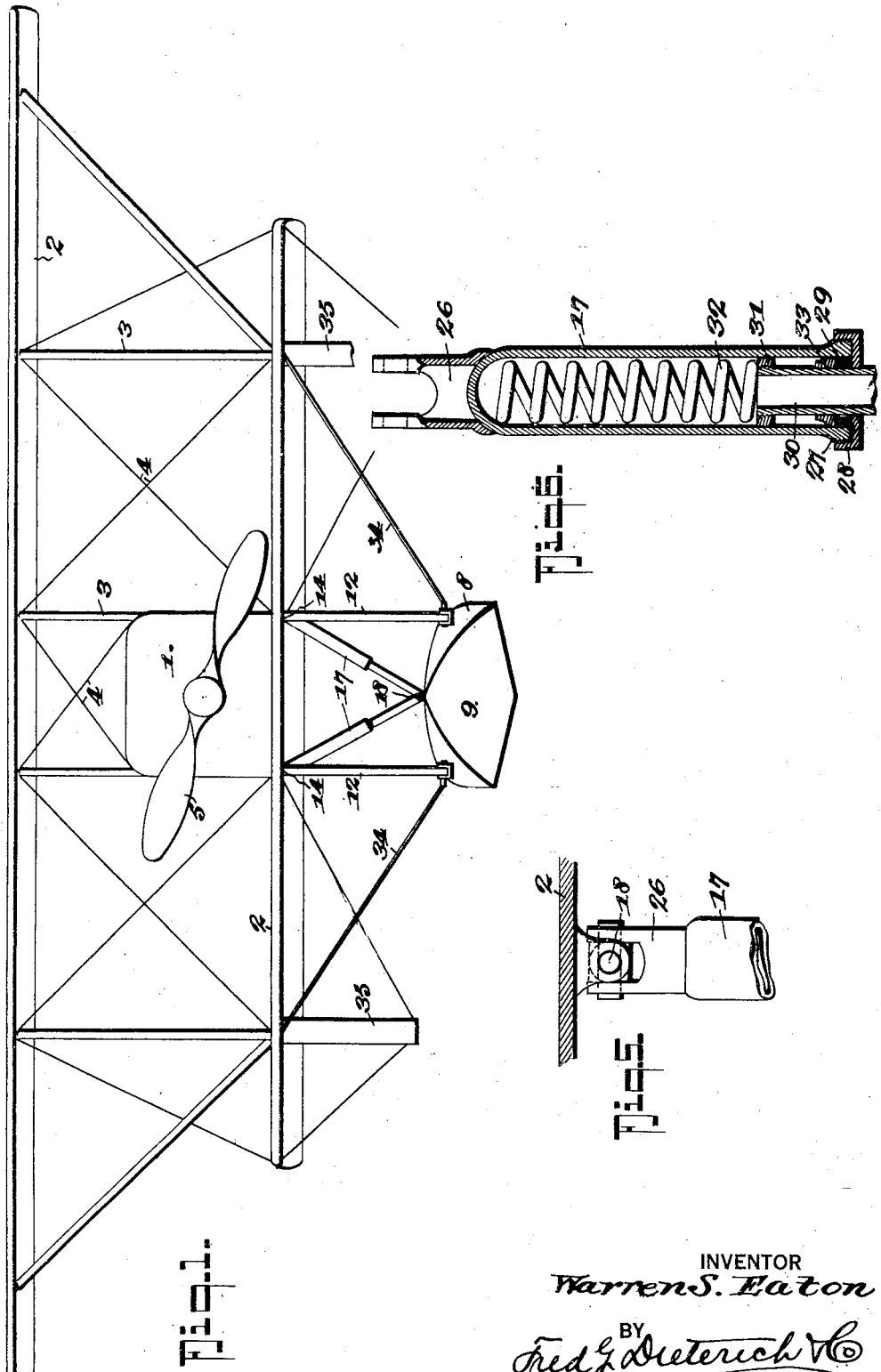

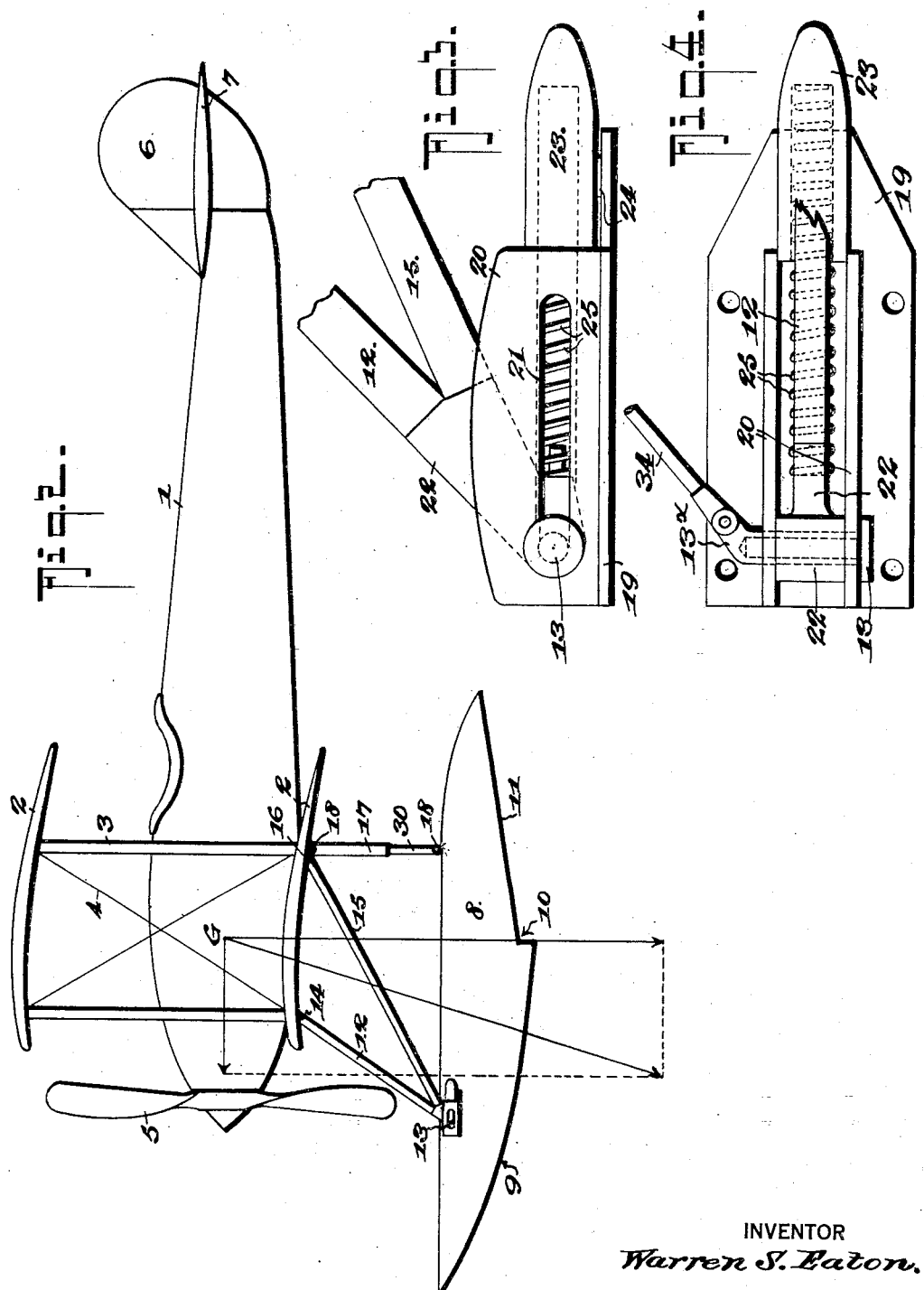

UNITED STATES PATENT OFFICE.

WARREN S. EATON, OF PLAINFIELD, NEW JERSEY.

HYDROAEROPLANE.

1,273,836. Specification of Letters Patent. Patented July 30, 1918.

Application filed July 20, 1917. Serial No. 181,819.

*To all whom it may concern:*

Be it known that I, WARREN S. EATON, residing at Plainfield, in the county of Union and State of New Jersey, have invented certain new and useful Improvements in Hydroaeroplanes, of which the following is a specification.

My invention relates to the art of aerial navigation and it has for its object to provide an improved construction of hydroaeroplane in which provision is made whereby the machine may rise from and alight upon the water in a convenient and safe manner and in which the connection between the aeroplane and the hydroplane is such as to absorb landing shocks and also act as a partial compensator for the movements of rough water whereby the aeroplane structure may be kept as steady as possible during the hydroplaning act.

Heretofore it has been found difficult to construct a hydroaeroplane which will quickly break from the water or which will readily alight upon the water without dipping forward, skipping or "nosing". In the present practice, in order to rise from the water, it is necessary to so manipulate the machine as to obtain fore and aft rocking action (called "horsing") in order to get the tail out of the water before the machine will break away from the water to plane in the air. This requires considerable skill on the part of the aviator, and is not a satisfactory manipulation for a quick get away from the water. It is therefore one of the objects of my invention to provide a hydroaeroplane not only having the flexible or shock absorbing connections between the aeroplane structure and the hydroplane structure but to have those connections so arranged that the necessity of "horsing" in order to break from the water, is avoided and a quick, easy and safe break from the water can be made at any and all times.

The invention also has for its object to provide a hydroaeroplane structure in which provision is made to assist the steering of the machine on the surface of the water and to prevent side turning of the machine, due to air currents meeting the resistance of the machine structure, and which would tend to swing the machine around on the hydroplane as a pivot.

More subordinately, the invention includes those novel details of construction, combination and arrangement of parts all of which will be first fully described, then be specifically pointed out in the appended claims and illustrated in the accompanying drawings, in which:

Figure 1 is a front elevation of a preferred form of the invention.

Fig. 2 is a side elevation of the same.

Fig. 3 is an enlarged side elevation of the front pivot by which the hydroplane and aeroplane structures are connected.

Fig. 4 is a top plan view of the parts shown in Fig. 3.

Fig. 5 is a detail view of a universal joint connection that may be employed between the rear shock absorber and the aeroplane and hydroplane structure.

Fig. 6 is a detail section of one of the rear shock absorbers illustrating one manner in which the same may be constructed.

Fig. 7 is a front elevation of a modification of the invention in which the rear shock absorbers are vertical instead of diagonal, as in the form shown in Fig. 1.

Fig. 8 is an enlarged detail view of a part of one of the shock absorbers employed in the form shown in Fig. 7.

Fig. 9 is a front elevation of a further modification of the invention showing the same employing two pontoons.

Fig. 10 is a side elevation of the same showing the rear rudder-tail supporting pontoons which are designed to move with the vertical rudders for steering purposes.

In the drawings, in which like numerals and letters of reference indicate like parts in all of the figures, 1 represents the fuselage, 2 the upper and lower planes, 3 the vertical struts connecting the upper and lower planes, 4 the bracing wires, 5 the propelling mechanism, while 6 designates the vertical rudder and 7 the horizontal rudder, all of which parts may be of the usual construction and operate in the usual manner.

8 designates the hydroplane which has the front curved planing surface 9 terminating in a backward step 10 which is preferably located approximately below the center of gravity G of the machine and from which the bottom of the hydroplane is rearwardly and upwardly inclined as at 11.

12 represents a strut which is rigidly secured at 14 beneath the lower plane 2 at the front and extends downwardly and forwardly and is pivotally connected at 13 with the hydroplane 8, the connection 13 being in the nature of a front and back yielding buffer connection, as best illustrated in Figs. 3 and 4 of the drawing, and which will be referred to later.

15 is another strut which is rigidly secured to the strut 12 at 22 and also rigidly secured at 16 beneath the bottom plane 2 near the rear of the same, and 17 designates a pair of shock absorbers connected by the universal joint 18 beneath the upper planes at approximately the upper point where the braces 15 are joined to the plane and also connected by universal joint 18 to the hydroplane 8, the shock absorbers 17 in the form shown in Figs. 1 and 2 being connected together in the central plane of the machine and diverging upwardly therefrom so as to act as diagonal braces to absorb lateral as well as vertical shocks.

19 designates the base of the brackets which are secured to the hydroplane 8 and have vertical walls 20 spaced apart to receive the head of the socket 22 in which the struts 12 and 15 are secured in any desired structural way. The head of the member 22 is pivoted on the pin 13, which connects with an angle member 13ˣ to which the brace 34 is connected, the brace 34 extending diagonally laterally from the pivoted point 13 to the under side of the lower plane 2, adjacent to the lateral extremities of the same. The braces 34, struts 12 and 15, hydroplane 8 and lower plane 2 of the aeroplane structure thus being relatively rigidly braced at the front.

The walls 20 are spaced apart, as before stated, and are also slotted as at 21, to permit the pin 13 to move back and forth in the slot 21, a spring 25 is provided for buffer purposes, the spring 25 engaging the member 22 and also projecting into a spring container 23 which is secured at 24 to the base plate 19.

The shock absorber 17 comprises an outer tubular casing 27 closed at the top, and at the bottom being provided with a cap 28 that is threaded onto the casing 27, a shock absorbing bumper or rebound member 29 being located within the casing 27 and between it and a limit ring 33, the limit ring 33 and rebound washer or bumper 29 being apertured to permit passage of the lower tubular member 30 of the shock absorber which projects into the upper member and carries a ring 31, which acts as a piston and is abutted by the spring 32, it being understood that the tube 30 is also closed at its lower end and thus not only does the spring 32 function as a shock absorber but the air spring within the tubular parts of the shock absorber also assists in the performance of this function.

35 designates supplemental hydroplanes secured to the extremities of the lower plane 2 so that should the structure tip laterally the planes will not dip into the water and become fouled.

Instead of having the two rear shock absorbers 17 arranged diagonally, as shown in Fig. 1, they may be arranged vertically as shown in Figs. 7 and 8 and in that event an additional transverse shock absorber is provided in connection with the shock absorber 17. This structure is best shown in Figs. 7 and 8, and by reference thereto it will be noticed that 40 is a transverse shock absorber consisting of a casing tube one end of which is permanently closed by a plug 42 that is connected by a universal joint 39 with one of the shock absorbers 17, the other end of the tube 40 being closed by a plug 41, the plugs 41 and 42 having apertures 45 to permit passage of the tension cables 36, one end of one of which is connected to the plug 42 while the adjacent end of the other cable 36 is connected to a sliding ring 44 within the casing of the shock absorber 40, a coil spring 43 being interposed between the plug 42 and ring 44 to continuously tend to separate the same. The other ends of each of the cables 36 are respectively connected beneath the lower plane 2 adjacent to the lateral extremities of the same (see Fig. 7). The cables 36 pass over sheaves 37 which are mounted at 38 on the shock absorber 17 and thus any lateral strains are conducted to the shock absorber 40 while the shock absorbers 17 take care of the vertical strains. The plug 42 is slidable in the tube 40.

In the form diagrammatically illustrated in Figs. 9 and 10, two pontoons 8 may be employed for sustaining the structure and the bracing and shock absorbing elements are simply duplicated, and may be as shown in such figures or diagonally disposed as in Fig. 1.

When desired, the steering shaft 46 of the vertical rudder 6 may be extended down or suitably connected so as to steer the hydroplane 48 which is connected to it so that as the rudders are turned by the usual operating mechanism (not shown) the hydroplane 48 may also be turned correspondingly and thus act as a rudder in the water, thereby giving greater facility of control while planing on the water than would be otherwise had were the rudder hydroplane 48 not employed. It should be understood that where there are a number of vertical rudders, as is the case in some types of machines, a corresponding number of steering hydroplanes 48 may also be employed.

47 designates a brace for the rudder shaft 46.

It will be observed that by constructing a hydroaeroplane as shown and described with the provision of the pivoted yieldable connection 13, together with the shock absorbing connections 17 with the universal joints 18, a very flexible mounting of the aeroplane on the hydroplane structure is obtained. When the hydroplane is on the water the weight of the aeroplane structure in repose will tend to compress the shock absorbers 17 and hold the pivot 13 at the forward extremity or limit and the center of gravity G will be located approximately over the step 10. As the machine is started, to rise from the water, the thrust will tend to move the aeroplane forwardly, while the lift will tend to raise the aeroplane from the water, thus relieving the weight of the structure from the hydroplane which becomes suspended, as it were, from the aeroplane structure and as the aeroplane structure lifts and moves forwardly, the center of gravity will correspondingly move forwardly of the step 10 with the result that the resultant vector of the thrust and lift (the reverse of the weight) will be thrown forwardly and tend to rock the tail of the hydroplane out of the water, thus tending to facilitate the breaking away of the hydroplane from the water during the act of rising from the water, or when the planes are properly set, those parts of the hydroaeroplane in the water will break from the water as a unit without rocking motion.

In landing, as the hydroplane strikes the water the shock, on the aeroplane structure, of the landing will be taken up by the shock absorbers 17, and the springs 25.

By locating the center of gravity in a vertical line to the rear of the pivot 13 and in the vicinity of the shock absorbing connection 17, the resultant vector of the thrust and weight passing through the center of gravity will be made to pass through the hydroplaning surface 9 to the rear of the pivot 13 and in the vicinity of the center of planing pressure.

In my copending application Serial No. 181,818, filed on even date herewith, I have disclosed broadly a structure in which the resultant vector of the thrust and weight will lie between the limits stated and preferably pass through the center of planing pressure and in this application I lay no claim to such features broadly, as they form the subject-matter of my copending application referred to, the present invention being especially designed to cover the constructional features whereby the flexible or shock absorbing connections between the aeroplane structure and the hydroplane structure are obtained.

From the foregoing description taken in connection with the accompanying drawings it is thought the complete construction, operation and advantages of my invention will be readily understood by those skilled in the art.

What I claim is:—

1. In a hydroaeroplane, a pontoon of the hydroplane type, an aeroplane structure complete in itself, a strut rigidly secured to the under plane of the aeroplane structure and extending forwardly and downwardly to the pontoon, a second strut rigidly secured beneath the aeroplane structure near the rear of the lower plane and extending downwardly and forwardly and joining with the fore strut, said fore strut and said second strut being pivotally connected to the pontoon, and aft shock absorbing connections between the pontoon and the aeroplane structure.

2. In a hydroaeroplane, a pontoon of the hydroplane type, an aeroplane structure complete in itself, a strut rigidly secured to the under plane of the aeroplane structure, and extending forwardly and downwardly to the pontoon, a second strut rigidly secured beneath the aeroplane structure near the rear of the lower plane and extending downwardly and forwardly and joining with the fore strut, said fore strut and second second strut being pivotally connected to the pontoon, and aft shock absorbing connections between the pontoon and the aeroplane structure, said aft shock absorbing connections comprising a plurality of shock absorbing struts universally connected to the pontoon and to the aeroplane structure.

3. In a hydroaeroplane, a pontoon of the hydroplane type, an aeroplane structure complete in itself, a strut rigidly secured to the under plane of the aeroplane structure and extending forwardly and downwardly to the pontoon, a second strut rigidly secured beneath the aeroplane structure near the rear of the lower plane and extending downwardly and forwardly and joining with the fore strut, said fore strut and second second strut being pivotally connected to the pontoon, aft shock absorbing connections between the pontoon and the aeroplane structure, said aft shock absorbing connections comprising a plurality of shock absorbing struts universally connected to the pontoon and to the aeroplane structure, and diverging laterally from the pontoon toward the aeroplane.

4. In a hydroaeroplane, a pontoon, an aeroplane structure, each of said parts being complete in itself, fore supports rigidly carried by the aeroplane structure and pivotally connected to the pontoon and vertically and transversely yieldable shock absorbing aft supports connecting the pontoon with the aeroplane structure.

5. In a hydroaeroplane, a pontoon, an aeroplane structure, means including shock absorbing elements for connecting said aeroplane structure with said pontoon, said means comprising fore supports and aft supports, means pivotally connecting the fore supports to the pontoon, means for pivotally connecting the aft supports to both the pontoon and aeroplane structures, and lateral bracing connections between the aeroplane structure and the front pivots of the fore supports with the pontoon.

6. In a hydroaeroplane, a pontoon, an aeroplane structure, means including shock absorbing elements for connecting said aeroplane structure with said pontoon, said means comprising fore supports pivotally and yieldably connected to the pontoon in advance of the center of gravity of the machine and shock absorbing aft supports with universal joints connecting the same to the pontoon and the aeroplane structure, said universal joints lying aft of the center of gravity, and lateral bracing connections between the aeroplane structure and the front pivots of the fore supports with the pontoon.

7. In a hydroaeroplane, a pontoon of the hydroplane type, an aeroplane structure complete in itself, a strut rigidly secured to the under plane of the aeroplane structure and extending forwardly and downwardly to the pontoon, a second strut rigidly secured beneath the aeroplane structure near the rear of the lower plane and extending downwardly and forwardly and joining with the fore strut, said fore strut and second strut being pivotally connected to the pontoon, aft shock absorbing connections between the pontoon and the aeroplane structures, and lateral bracing connections between the aeroplane structure and the front pivots of the fore supports with the pontoon.

8. In a hydroaeroplane, a pontoon of the hydroplane type, an aeroplane structure complete in itself, a strut rigidly secured to the under plane of the aeroplane structure and extending forwardly and downwardly to the pontoon, a second strut rigidly secured beneath the aeroplane structure near the rear of the lower plane and extending downwardly and forwardly and joining with the fore strut, said fore strut and said second strut being pivotally connected to the pontoon, and aft shock absorbing connections comprising a plurality of shock absorbing struts universally connected to the pontoon and to the aeroplane structure, and lateral bracing connections between the aeroplane structure and the front pivots of the fore supports with the pontoon.

9. In a hydroaeroplane, a pontoon of the hydroplane type, an aeroplane structure complete in itself, a strut rigidly secured to the under plane of the aeroplane structure and extending forwardly and downwardly to the pontoon, a second strut rigidly secured beneath the aeroplane structure near the rear of the lower plane and extending downwardly and forwardly and joining with the fore strut, said fore strut and second strut being pivotally connected to the pontoon, aft shock absorbing connections between the pontoon and the aeroplane structure, said aft shock absorbing connections comprising a plurality of shock absorbing struts universally connected to the pontoon and to the aeroplane structure, and diverging laterally from the pontoon toward the aeroplane structure, and lateral bracing connections between the aeroplane structure and the front pivots of the fore supports with the pontoon.

10. In a hydroaeroplane, a pontoon, an aeroplane structure, each of said parts being complete in itself, fore supports rigidly carried by the aeroplane structure and pivotally and yieldably connected to the pontoon, vertically and transversely yieldable shock absorbing aft supports connecting the pontoon with the aeroplane structure, and lateral bracing connections between the aeroplane structure and the front pivots of the fore supports with the pontoon.

11. In a hydroaeroplane, a pontoon, an aeroplane structure complete in itself, fore and aft supports connecting the aeroplane structure with the pontoon, said aeroplane structure including a vertical rudder, an auxiliary pontoon connected with the vertical rudder to move with the vertical rudder, said fore supports connecting the pontoon and aeroplane structure with the points of connection lying in advance of the center of gravity, and said aft support connecting the pontoon and aeroplane structure with the points of connection lying aft of the center of gravity, the connection between the fore supports and the pontoon including a yieldable pivotal connection, said connection being yieldable in the longitudinal direction of the pontoon.

12. In a hydroaeroplane, a pontoon, an aeroplane structure complete in itself, fore and aft supports connecting the aeroplane structure with the pontoon, said aeroplane structure including a vertical rudder, an auxiliary pontoon carried by the vertical rudder to move with the vertical rudder, said fore supports connecting the pontoon and aeroplane structure with the points of connection lying in advance of the center of gravity, and said aft support connecting the pontoon and aeroplane structure with the points of connection lying aft of the center of gravity, the connection between said fore and aft supports and said pontoon being pivotal and yieldable in the longitudinal direction of the pontoon.

13. In a hydroaeroplane, a pontoon, an aeroplane structure, fore supports carried by the aeroplane structure and pivotally and yieldably connected to the pontoon in advance of the center of gravity, aft supports universally connected with the aeroplane structure and with the pontoon and lying aft of the center of gravity, said aeroplane structure including a vertically held lateral steering rudder, and an auxiliary pontoon adjacent said rudder and movable with the same, substantially as shown and described, the yieldable and pivotal connection of said fore supports being yieldable in the longitudinal direction of the pontoon.

14. In a hydroaeroplane, a pontoon, an aeroplane structure, means including shock absorbing elements for connecting said aeroplane structure with said pontoon, said means comprising fore supports rigidly secured to the aeroplane structure and pivotally and yieldably connected to the pontoon in advance of the center of gravity of the machine, and shock absorbing aft supports with universal joints connecting the same to the pontoon and the aeroplane structure, said universal joints lying aft of the center of gravity.

WARREN S. EATON.